US006885880B1

(12) United States Patent
Ali

(10) Patent No.: US 6,885,880 B1
(45) Date of Patent: Apr. 26, 2005

(54) INVERTED-F ANTENNA FOR FLIP-STYLE MOBILE TERMINALS

(75) Inventor: Mohammod Ali, Cary, NC (US)

(73) Assignee: Teleponaktiebolaget LM Ericsson (publ.) (SE)

(*) Notice: Subject to any disclaimer, the term of this patent is extended or adjusted under 35 U.S.C. 154(b) by 492 days.

(21) Appl. No.: 09/668,448

(22) Filed: Sep. 22, 2000

(51) Int. Cl.$^7$ ............................................. H04M 1/00
(52) U.S. Cl. ........................... 455/575.7; 455/575.1; 455/575.3; 455/90.3; 379/433.13; 343/702
(58) Field of Search ........................... 455/90.1–90.3, 455/575.1–7, 550.1, 552.1, 351, 347–349, 128–129, 90, 575, 550; 379/428.01, 433.1, 433.11–433.13, 433.01; 343/702; 200/61.7

(56) References Cited

U.S. PATENT DOCUMENTS

| 5,014,346 A | * | 5/1991 | Phillips et al. ........... 455/575.7 |
| 5,138,328 A | | 8/1992 | Hamilton et al. ........... 343/702 |
| 5,184,143 A | | 2/1993 | Marko ........................ 343/749 |
| 5,561,437 A | | 10/1996 | Krena et al. ............... 343/702 |
| 5,606,730 A | * | 2/1997 | Rush et al. ............... 455/575.3 |
| 5,809,433 A | * | 9/1998 | Thompson et al. ........ 455/575.7 |
| 5,832,079 A | * | 11/1998 | Rabe ...................... 379/433.13 |
| 5,930,353 A | * | 7/1999 | Lee et al. ............... 379/433.05 |
| 5,999,831 A | * | 12/1999 | Itoh ........................ 455/575.7 |
| 6,181,284 B1 | | 1/2001 | Kunz et al. ................. 343/702 |
| 6,272,356 B1 | * | 8/2001 | Dolman et al. ........... 455/575.3 |
| 6,288,680 B1 | * | 9/2001 | Tsuru et al. ............... 343/702 |
| 6,414,643 B2 | * | 7/2002 | Cheng et al. ............... 343/702 |
| 6,487,396 B1 | * | 11/2002 | Sassi ........................ 455/90.1 |
| 6,529,749 B1 | * | 3/2003 | Hayes et al. ............. 455/575.7 |

OTHER PUBLICATIONS

Inverted F Antenna, http://www.qsl.net/kb7/antenna/Inverted%2OF/, Sep. 15, 2000.

* cited by examiner

*Primary Examiner*—Lee Nguyen
*Assistant Examiner*—Tuan Tran
(74) *Attorney, Agent, or Firm*—Coats & Bennett, P.L.L.C.

(57) ABSTRACT

A flip or calm-shell style mobile terminal comprises a mechanical hinge that doubles as an inverted-F antenna for auxiliary communication purposes such as with a Bluetooth transceiver or a GPS receiver.

18 Claims, 5 Drawing Sheets

INVERTED-F ANTENNA FOR FLIP-STYLE MOBILE TERMINALS

BACKGROUND OF THE INVENTION

The present invention is directed to an antenna for use in a mobile terminal and particularly to an auxiliary antenna for use in a mobile terminal.

Mobile terminals, such as cellular phones, pagers, personal digital assistants, and the like have exploded into the public's consciousness. One recent innovation pioneered by a consortium of mobile terminal manufacturers is a communication technology called Bluetooth that operates in the ISM band at 2.4 to 2.485 GHz in the electromagnetic spectrum. Mobile terminals are being adapted to incorporate this technology. Mobile terminals are also being adapted to operate with position detection systems, such as the Global Positioning System (GPS). GPS operates at 1.57542 GHz.

Due to the fact that these technologies operate at frequencies different from those normally associated with wireless communications, mobile terminals need additional, or at least different, antennas to function properly with these technologies.

BRIEF SUMMARY OF THE INVENTION

The present invention comprises using a mechanical hinge in a flip or clam-shell style mobile terminal as an inverted-F antenna for auxiliary communication purposes such as with a Bluetooth transceiver or a GPS receiver. In one embodiment, a first part of the hinge (a first hinge plate) is attached to the signal line of the RF printed circuit board of the mobile terminal by a fastener such as a screw. A second screw adjacent to the first screw is attached between the ground of the RF printed circuit board and the hinge. Together the first part and the two screws form an inverted-F antenna. A second part of the hinge (a second hinge plate) is coupled to the first part and forms the remainder of the mechanical hinge. In some embodiments, meanders are used to lengthen the electrical length of the first part so as to achieve an optimal operating frequency.

DETAILED DESCRIPTION OF THE INVENTION

The present invention is directed to an improved antenna arrangement in flip-type mobile terminals. In particular, the present invention provides an inverted F-antenna integrated into a hinge. A "hinge" as used herein includes both hinge plates and pivot area. It should be appreciated that while the hinges illustrated herein include a pin as the pivot, they may also be living hinges if needed or desired. This additional antenna allows the mobile terminal to communicate at another frequency while allowing isolation between the antennas of the mobile terminal to reduce crosstalk and other electromagnetic interference.

Figure 1:
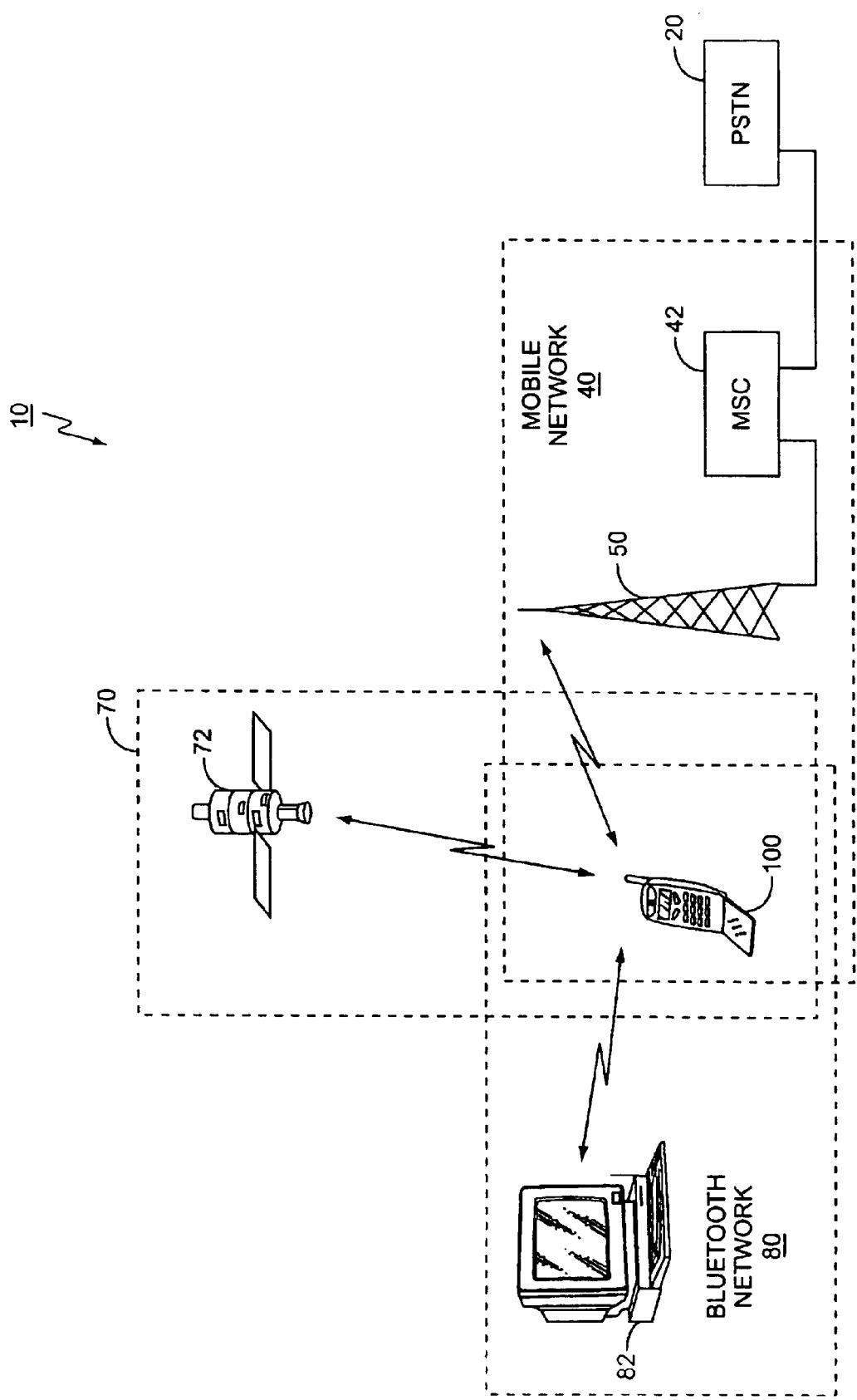
FIG. 1 illustrates a communication environment that may include a wireless network for use with the present invention.

As illustrated in FIG. 1, a communication environment 10 may include a mobile network 40, a location detection network 70, and a Bluetooth network 80. A mobile terminal 100 may be positioned in one or more of these networks.

Mobile network 40 may comprise, amongst other elements, an MSC 42 and a base station 50. MSC 42 may be communicatively coupled to the Public Switched Telephone Network (PSTN) 20 or other mobile networks 40 within the Public Land Mobile Network (PLMN, not shown) as is conventional. The operation of mobile network 40, and mobile terminal 100 within the mobile network 40, are well documented in various standards such as TIA/EIA-136, Digital Advance Mobile Phone Service (D-AMPS), European Total Access Communication System (ETACS), Code Division Multiple Access (CDMA), Global System for Mobile Communication (GSM), Pacific Digital Cellular (PDC), and the like, the standards and documentation of which are herein incorporated by reference.

Location detection network 70 may be a satellite-based system, a terrestrial system or some hybrid thereof. Location detection network 70 is illustrated as a satellite system comprising one or more satellites 72. The most common location detection system is the Global Positioning System (GPS), although the Russian equivalent, GLONASS, is another option. Other systems may likewise be available. Typically, satellites 72 communicate with mobile terminals 100 over a different frequency than that on which the mobile terminals 100 communicate with the mobile network 40. For example, GPS satellites communicate at 1.57542 GHz. The GPS standards are partially publicly available at http://www.navcen.uscg.mil/pubs/gps/icd200/icd200c.pdf and are hereby incorporated by reference.

Bluetooth network 80 may comprise a Bluetooth enabled computer 82 or other Bluetooth enabled device such as another mobile terminal 100, a vehicle or the like as needed or desired. Bluetooth is well documented at www.bluetooth-.com. In particular, the specifications, volumes 1 and 2 are hereby incorporated by reference in their entirety. These are publicly available at http://www.bluetooth.com/developer/specification/specification.asp. Bluetooth communications likewise communicate with mobile terminals 100 over a different frequency than that on which the mobile terminals 100 communicate with the mobile network 40. In particular, Bluetooth enabled devices communicate at approximately 2.4 GHz in the ISM band.

Figure 2:
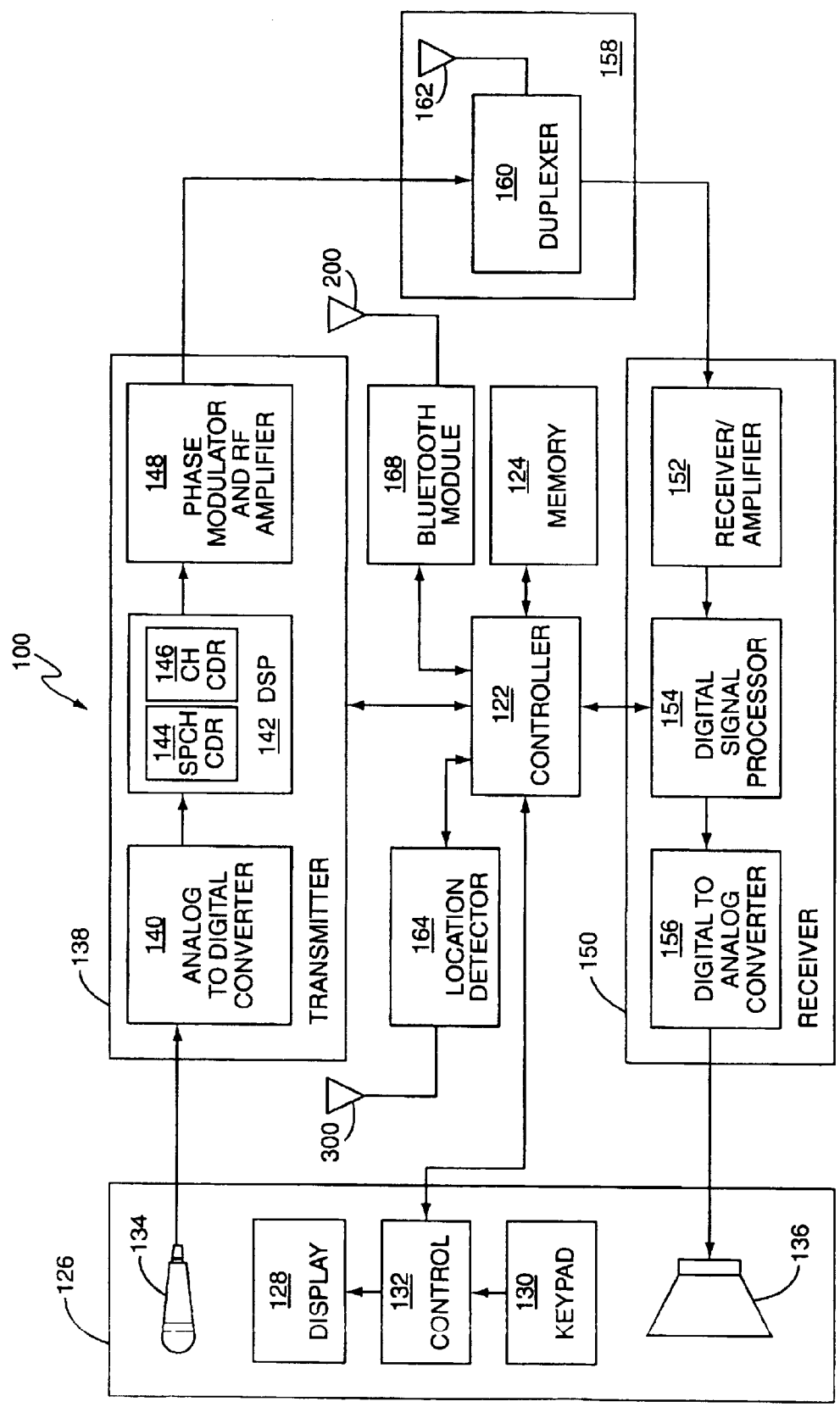
FIG. 2 illustrates a mobile terminal that may be adapted for use with the present invention.

The present invention is adapted for use in the mobile terminal 100 to enable mobile terminal 100 to communicate with the various networks within communication environment 10. However, a more complete understanding of the mobile terminal 100 may be helpful. Turning now to FIG. 2, a block diagram of a mobile terminal 100 is illustrated. Mobile terminal 100 typically includes a controller 122, an operator interface 126, a transmitter 138, a receiver 150, and a primary antenna assembly 158. Operator interface 126 typically includes a display 128, keypad 130, interface control 132, microphone 134, and a speaker 136. Display 128 allows the operator to see dialed digits, call status, and other service information. Keypad 130 allows the operator to dial numbers, enter commands, and select options. Interface control 132 interfaces the display 128 and keypad 130 with the controller 122. Microphone 134 receives acoustic signals from the user and converts the acoustic signals to an analog electrical signal. Speaker 136 converts analog electrical signals from the receiver 150 to acoustic signals that can be heard by the user.

The analog electrical signal from the microphone 134 is supplied to the transmitter 138. Transmitter 138 includes an analog to digital converter 140, a digital signal processor 142, and a phase modulator and RF amplifier 148. Analog to digital converter 140 changes the analog electrical signal from the microphone 134 into a digital signal. The digital signal is passed to the digital signal processor (DSP) 142, which contains a speech coder 144 and channel coder 146. Speech coder 144 compresses the digital signal and the channel coder 146 inserts error detection, error correction and signaling information. DSP 142 may include, or may work in conjunction with, a DTMF tone generator (not shown). The compressed and encoded signal from the digital signal processor 142 is passed to the phase modulator and RF amplifier 148, which are shown as a combined unit in FIG. 2. The modulator converts the signal to a form that is suitable for transmission on an RF carrier. RF amplifier 148 then boosts the output of the modulator for transmission via the primary antenna assembly 158.

Receiver 150 includes a receiver/amplifier 152, digital signal processor 154, and a digital to analog converter 156. Signals received by the primary antenna assembly 158 are passed to the receiver/amplifier 152, which shifts the frequency spectrum, and boosts the low-level RF signal to a level appropriate for input to the digital signal processor 154.

Digital signal processor 154 typically includes an equalizer to compensate for phase and amplitude distortions in the channel corrupted signal, a demodulator for extracting bit sequences from the received signal, and a detector for determining transmitted bits based on the extracted sequences. A channel decoder detects and corrects channel errors in the received signal. The channel decoder also includes logic for separating control and signaling data from speech data. Control and signaling data are passed to the controller 122. Speech data is processed by a speech decoder and passed to the digital to analog converter 156. Digital signal processor 154, may include, or may work in conjunction with, a DTMF tone detector (not shown). Digital to analog converter 156 converts the speech data into an analog signal that is applied to the speaker 136 to generate acoustic signals that can be heard by the user.

Together, the transmitter 138 and the receiver 150 are referred to herein as a voice communication transceiver.

Primary antenna assembly 158 is connected to the RF amplifier of the transmitter 138 and to the receiver/amplifier 152 of the receiver 150. Primary antenna assembly 158 typically includes a duplexer 160 and an antenna 162. Duplexer 160 permits full duplex communications over the antenna 162.

Controller 122 coordinates the operation of the transmitter 138 and the receiver 150, and may for instance take the form of a typical microprocessor. This microprocessor may be a dedicated or shared microprocessor and may be a single processor or multiple parallel processors as needed or desired. This coordination includes power control, channel selection, timing, as well as a host of other functions known in the art. Controller 122 inserts signaling messages into the transmitted signals and extracts signaling messages from the received signals. Controller 122 responds to any base station commands contained in the signaling messages, and implements those commands. When the user enters commands via the keypad 130, the commands are transferred to the controller 122 for action. Memory 124 stores and supplies information at the direction of the controller 122 and preferably includes both volatile and non-volatile portions. It is expected that controller 122 and memory 124 as well as many of the other processing components described herein will be positioned on a printed circuit board 190 (FIG. 4) as is conventional.

In addition to the above-described elements, the mobile terminal 100 may also include a location detector 164 in communication with the controller 122. Location detector 164 may have its own antenna 300 discussed below. Location detector 164 may be a Global Positioning System (GPS) receiver or other satellite or terrestrial system as needed or desired. Typically, the location detector 164 will output a geocoordinate expressed as longitude, latitude, and, optionally, altitude coordinates corresponding to the present location of the mobile terminal 100.

Mobile terminal 100 may also include a Bluetooth module 168 together with Bluetooth antenna 200. Bluetooth is discussed above and reference is made thereto. Bluetooth module 168 is designed to comply with the standards set forth for Bluetooth and enable wireless communication at approximately 2.4 GHz between Bluetooth enabled devices. Controller 122 may control Bluetooth module 168 as needed or desired.

As noted, various antennas maybe associated with the mobile terminal 100. Antennas operate most efficiently when they are one quarter the length of the signal desired to be received. Thus, to facilitate proper communication in a mobile terminal 100 amongst the various networks 40, 70, and 80, it may be desirable to have three different antennas. Further, many mobile terminals 100 are already designed to operate in two or three modes so as to communicate with different mobile networks 40 that may employ different standards alternatively requiring more antennas. Typically, a mobile terminal 100 may operate at one or more of the following frequency ranges: 824–894 MHz, 880–960 MHz, 1710–1880 MHz, and 1850–1990 MHz, depending on which standards with which it complies.

It is known to add antennas having the desired length to mobile terminals 100 to add additional functionality. However, these additional antennas require additional circuitry and additional space in or about the mobile terminals. Further, the antennas must be separated sufficiently to insure proper mutual isolation so as to reduce crosstalk or other forms of electromagnetic interference. While filters can be used to reduce crosstalk, filters for closely spaced antennas tend to be bulky and relatively expensive to achieve the performance required. Alternatively a "window" may be created which allows an internally positioned antenna to communicate through the body 170 (FIG. 3) of the mobile terminal 100. However, this imposes additional undesirable constraints on circuit board design. Thus, for antennas for Bluetooth or GPS applications, especial care must be taken to not interfere with the primary cellular antenna assembly 158.

Figure 3:
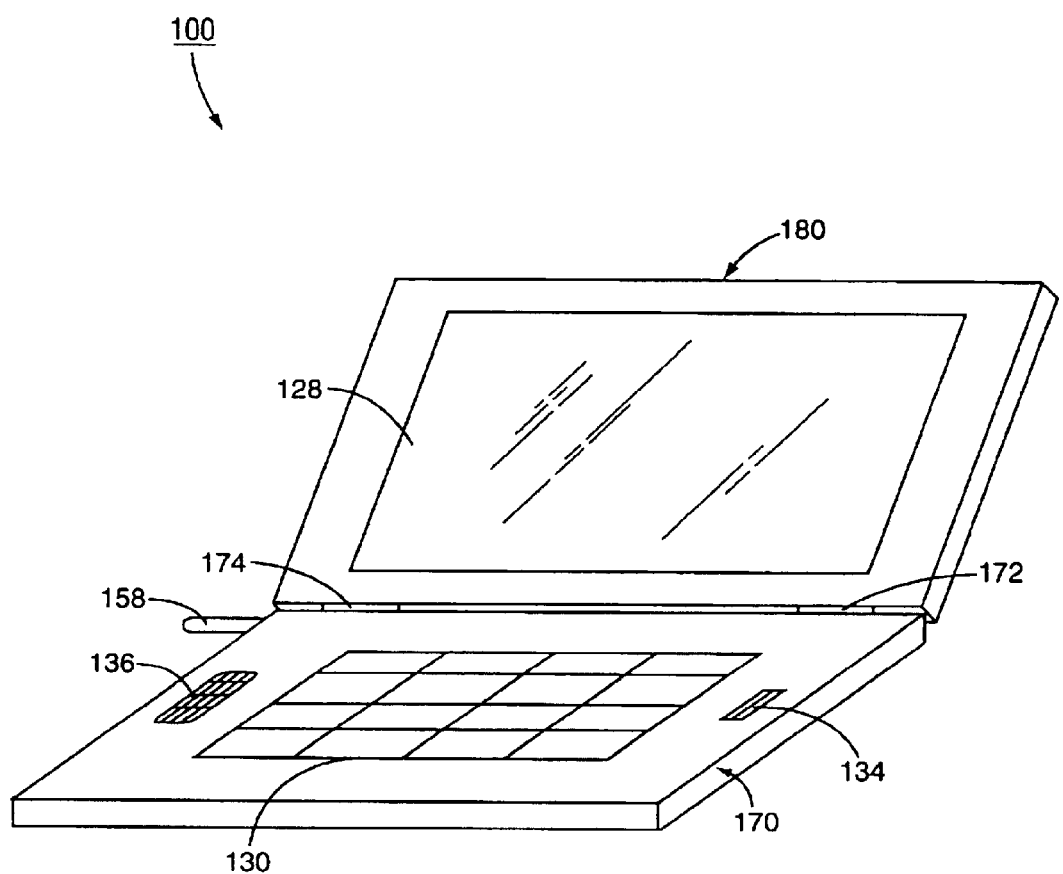
FIG. 3 illustrates a perspective view of a flip-type mobile terminal suitable for use with the present invention.

A mobile terminal 100 incorporating the present invention is illustrated in a perspective view in FIG. 3. Mobile terminal 100 is a flip-type or clamshell-type mobile terminal having a body 170 and a flip portion 180 hingedly connected one to the other by hinges 172 and 174. It should be appreciated that in some embodiments, only one hinge 172 may connect the flip portion 180 to the body 170. Display 128 may be mounted on the mobile terminal 100, and, in this case, on the flip portion 180. However, it should be appreciated, that in some mobile terminals 100, such as a cellular phone, the flip portion 180 may have no additional components. Mobile terminal 100 may also comprise a keypad 130, a microphone 134 and a speaker mounted on body 170. Again, it should be appreciated that some or all of these components instead could be mounted on the flip portion 180 if needed or desired. Primary antenna assembly 158 is shown as a stub antenna, but may include other classes of external or internal antennas designed to operate at conventional cellular frequencies or the like.

It should be appreciated that the term "mobile terminal" may include a cellular radiotelephone with or without a multi-line display, a Personal Communications System (PCS) terminal that may combine a cellular radiotelephone with data processing, facsimile and data communications capabilities; a PDA that can include a radiotelephone, pager, Internet/intranet access, Web browser, organizer, and/or calendar; and a conventional laptop and/or palmtop receiver or other appliance that includes a radiotelephone transceiver. Mobile terminals may also be referred to as "pervasive computing" devices. Thus, while the present discussion may be couched in terms of a phone and/or a laptop computer, the present invention is equally applicable to these other sorts of devices. The previous discussion was by way of example, and not intended to be limiting on the definition of a mobile terminal.

The present invention uses hinges 172 and/or 174 to act as the antennas for location detector 164 and/or the Bluetooth module 168. While such applications may be of primary commercial importance at the present time, it should be appreciated that an antenna created within the hinges 172 or 174 may equally be adapted for other purposes or devices within the mobile terminal 100, such as Asia's i-Mode, another frequency antenna to make the mobile terminal 100 dual-mode or even tri-mode, or the like as needed or desired. Further, in mobile terminals 100 that include two hinges 172, 174, both hinges may be changed to antenna hinges according to the present invention. For example, a first hinge 172 could be adapted for Bluetooth performance and a second hinge 174 adapted for GPS reception. Other permutations on this concept will be readily apparent to those of ordinary skill in the art.

Figure 4:
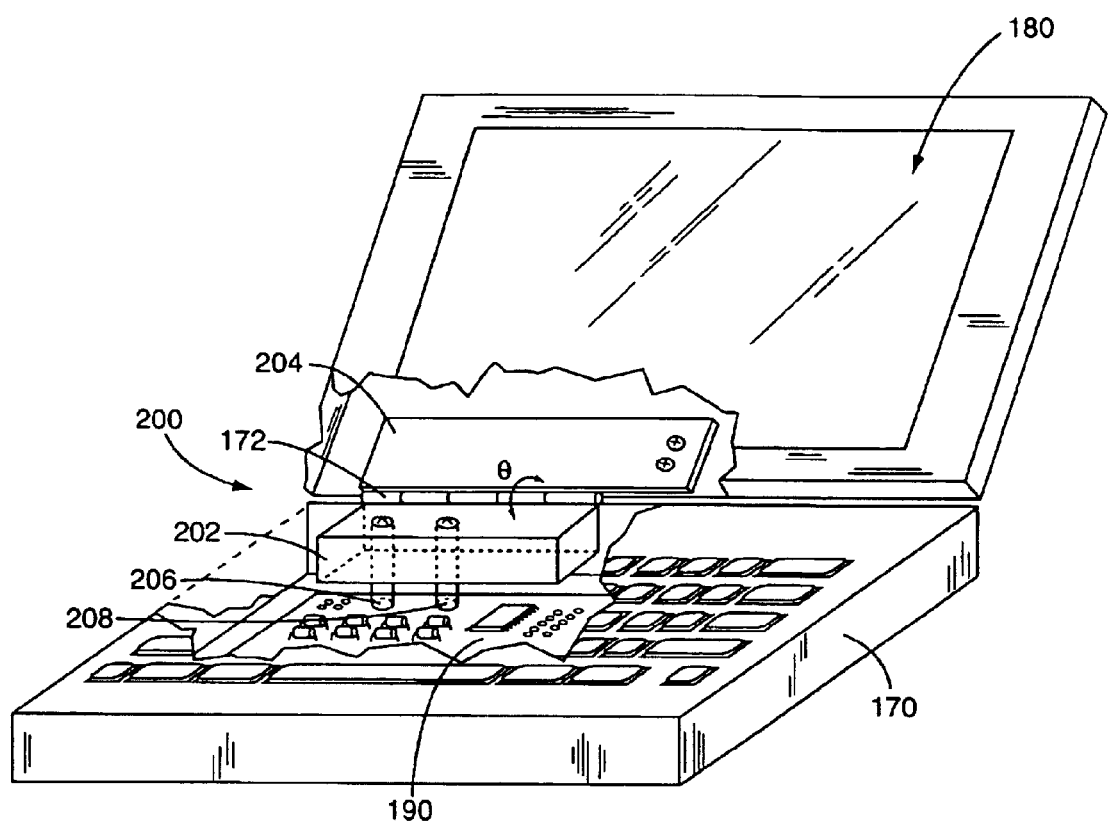
FIG. 4 illustrates one embodiment of an antenna constructed according to the present invention.

FIG. 4 illustrates a first embodiment of the present invention. In particular, a hinge, for the purposes of illustration, hinge 172, connects the flip portion 180 to the body 170 of the mobile terminal 100. Hinge 172 is formed from two parts, a first part 202 and a second part 204. In the event the flip portion 180 includes a display 128, hinge 172 is constructed to allow a flex-film line (constructed of a suitable polyimide material) to carry signals to the display from the body 170 and particularly from the controller 122 on the printed circuit board 190.

First part 202 is spaced from and attached to the printed circuit board 190 by two fasteners 206 and 208 respectively. Together, the first part 202 and the fasteners 206, 208 form an inverted-F antenna. Suitable fasteners include screws or the like. Thus, the shank of the screw may space the first part 202 from the printed circuit board 190. One fastener 206 acts as a connection to the ground plane of the printed circuit board 190. The other fastener 208 acts as a the RF feed for the antenna 200, connecting antenna 200 to the appropriate circuitry on the printed circuit board 190 such as the location detector 164 or the Bluetooth module 168. Note that choosing which fastener acts as the ground connection and which acts as the RF signal connection is well understood. It should be appreciated that the ground feed and the RF feed could alternatively be provided by another structure that does not fasten the antenna 200 to the printed circuit board and that the antenna 200 may be held in place by fastening the antenna 200 to the body 170 of the mobile terminal 100. It should be appreciated that the first part 202 and the fasteners 206 and 208 need to be capable of receiving electromagnetic signals, and thus are likely to be metal. Further, the spacing of the fasteners 206, 208 may be varied to achieve impedance matching or otherwise improve performance.

While dimensions of the hinge 172 are not critical to the present invention, sample appropriate dimensions are as follows: first part 202 length 25 mm, height 4 mm, and width 5 mm; second part 204 length 30 mm, height 0.02 mm, and width 7 mm. In general, the size of the two parts 202 and 204 will be dictated by the mechanical strength requirements of the hinge 172. Angle $\Theta$ represents the angle between first part 202 and second part 204. In one embodiment, antenna 200 should function as desired regardless of the angle $\Theta$. This, however, may be somewhat dependent upon the operating frequency of the antenna 200.

Figure 5:
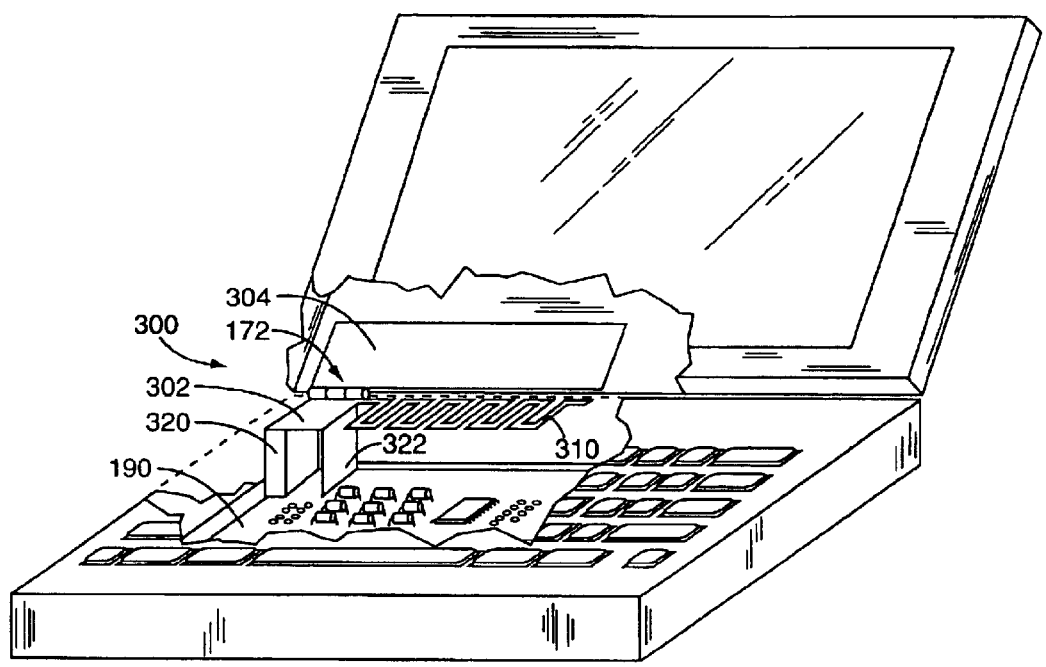
FIG. 5 illustrates a second embodiment of an antenna with meanders constructed according to the present invention.

A second embodiment is illustrated in FIG. 5. In this embodiment, especially adapted for GPS reception, antenna 300 comprises a first part 302 and a second part 304. Similarly to the previous embodiment, one fastener (not shown) may connect part 302 to the signal line of the RF printed circuit board and another fastener (not shown) may connect the ground of the RF printed circuit board to part 302 is required. This has been achieved here using plates 320, 322 respectively as illustrated. Note that plate 320 may be thicker than plate 322. First part 302 includes a meander 310 to make it electrically longer without changing the axial length of the first part 302. Second part 306 may likewise be coated with a plastic film so as not to short out the meanders 310 when the hinge 172 is in a closed position. For a further discussion of meander antennas in the field of mobile terminals, reference is made to application Ser. No. 09/089, 433, which is hereby incorporated by reference in its entirety. Alternatively, a film may be positioned atop meanders 310 to perform the same function. Other alternate techniques to isolate the parts 304 and 306 may also occur to those of ordinary skill in the art.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A mobile terminal comprising:
   a body;
   a flip portion; and
   a hinge connecting said body to said flip portion, said hinge comprising hinge plates that function as an inverted-F antenna for use by an electronic circuit positioned within said mobile terminal.

2. The mobile terminal of claim 1 wherein said antenna is operative at frequencies between 2.4 and 2.485 GHz.

3. The mobile terminal of claim 1 wherein said antenna operates within the ISM band.

4. The mobile terminal of claim 1 wherein said antenna receives a GPS signal.

5. The mobile terminal of claim 1 further comprising a second hinge, said second hinge comprising second hinge plates that function as a second antenna.

6. The mobile terminal of claim 5 wherein said first antenna is adapted for use at frequencies ranging from 2.4 to 2.485 GHz and said second antenna is adapted for receiving a GPS signal.

7. The mobile terminal of claim 1 further comprising a printed circuit board adapted to hold said electronic circuit.

8. The mobile terminal of claim 7 further comprising a fastener attaching said antenna to said printed circuit board.

9. The mobile terminal of claim 8 wherein said fastener is a screw.

10. The mobile terminal of claim 9 further comprising a second fastener attaching said antenna to said printed circuit board.

11. The mobile terminal of claim 10 wherein one of said fasteners acts as a connection to ground for said antenna and the other of said fasteners acts as an RF feed for said antenna.

12. A method of constructing a mobile terminal, comprising:

positioning a printed circuit board in the mobile terminal;

fastening an inverted-F antenna to said printed circuit board; and using said inverted-F antenna to function as hinge plates of a hinge for a flip portion of said mobile terminal.

13. The method of claim 12 further comprising receiving and transmitting Bluetooth communications through said antenna.

14. The method of claim 12 further comprising receiving a GPS signal through said antenna.

15. The method of claim 12 wherein fastening an antenna to said printed circuit board comprises using a first fastener as a connection to ground and using a second fastener as an RF feed.

16. The method of claim 12 further comprising opening and closing said hinge during operation of the mobile terminal.

17. A mobile terminal comprising:

a body;

a printed circuit board positioned inside said body;

a flip portion; and a hinge, said hinge functioning as an inverted-F antenna and hingedly securing said flip portion to said body, said hinge electrically coupled to said printed circuit board.

18. The mobile terminal of claim 17 further comprising a voice communication transceiver and a second antenna adapted for use with said voice communication transceiver, said voice communication transceiver positioned within said body, and said second antenna spaced from said inverted-F antenna.

* * * * *